United States Patent [19]

Weber

[11] 4,439,158

[45] Mar. 27, 1984

[54] TEACHING INDICATOR FOR EFFICIENT VEHICLE GEARSHIFT OPERATION

[76] Inventor: Harold J. Weber, P.O. Box 315, 20 Whitney Dr., Sherborn, Mass. 01770

[21] Appl. No.: 337,585

[22] Filed: Jan. 7, 1982

[51] Int. Cl.³ ............................................. G09B 9/04
[52] U.S. Cl. ..................................................... 434/71
[58] Field of Search ................... 434/62, 64, 65, 63, 434/66, 67, 69, 71, 29, 33, 34, 43–45, 49–53; 340/52 R, 52 F; 273/85 G, 86 R, 86 B

[56] References Cited

U.S. PATENT DOCUMENTS

| 2,808,658 | 10/1957 | Stern et al. | 434/53 |
| 3,039,693 | 6/1962 | Schwarm | 434/49 |
| 4,060,915 | 12/1977 | Conway | 434/338 |
| 4,150,497 | 4/1979 | Weber | 434/71 |
| 4,320,381 | 3/1982 | Olivier | 434/71 |
| 4,355,296 | 10/1982 | Drone | 434/71 |

FOREIGN PATENT DOCUMENTS 2036404 6/1980 United Kingdom ................... 434/71

*Primary Examiner*—Vance Y. Hum

[57] ABSTRACT

Driving aid apparatus for use with a motor vehicle having a manual gearshift transmission and clutch, and providing the driver with guidance for the correct upshift or downshift timing which can contribute to fuel savings and less mechanical abuse of the vehicle's drive train. The exact upshift or downshift indication is computed from engine speed, gear combination, engine loading, and other influential factors including engine temperature, vehicle speed, vehicle loading, and transmission temperature. The driver is provided with a manual adjustment, in the form of a dashboard mounted control, which enables the selection of driving conditions which best suit the driver's individual needs. Through this adjustable control, the driver can establish a shift timing sequence which leads to maximum fuel economy, or alternatively he can optimize the vehicle's performance in the sense of acceleration and speed. Custom programmed memory elements further provide a predetermined vehicle performance profile which enables the computed shift points, for the individual motor vehicle, to be best tailored to the optimum performance conditions which may be expected from the vehicle's particular combination of weight, gear ratio, and horsepower. In concert with the clear visual or audible indication afforded the driver as to when an upshift or downshift should occur, the driving aid also provides a digital display figure indication of the gearing into which the transmission ought to be shifted together with a separate real time digital indication which clearly shows the gear selection which is presently engaged. A warning indication occurs whenever the driver improperly "rides" the clutch pedal of the vehicle.

25 Claims, 15 Drawing Figures

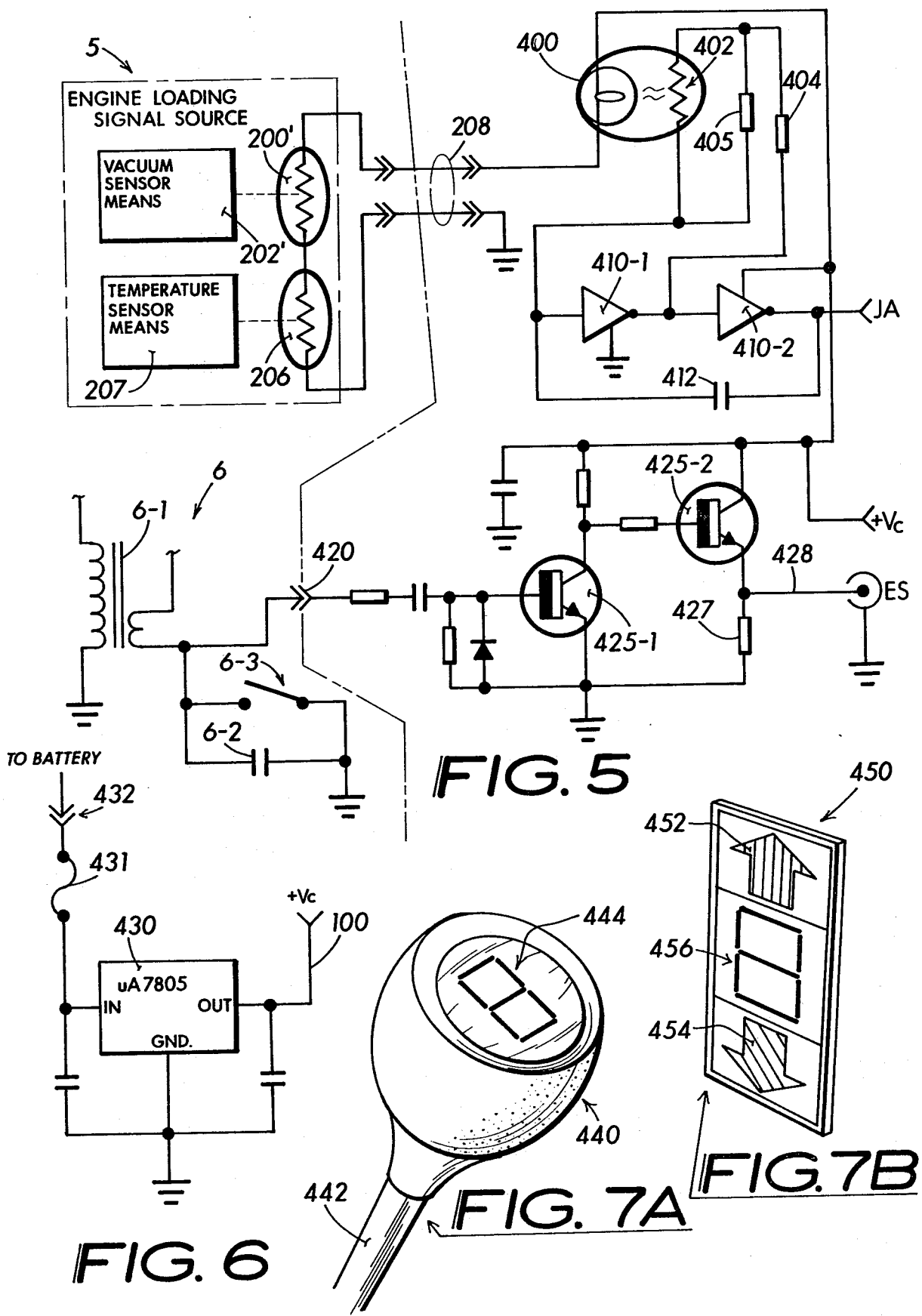

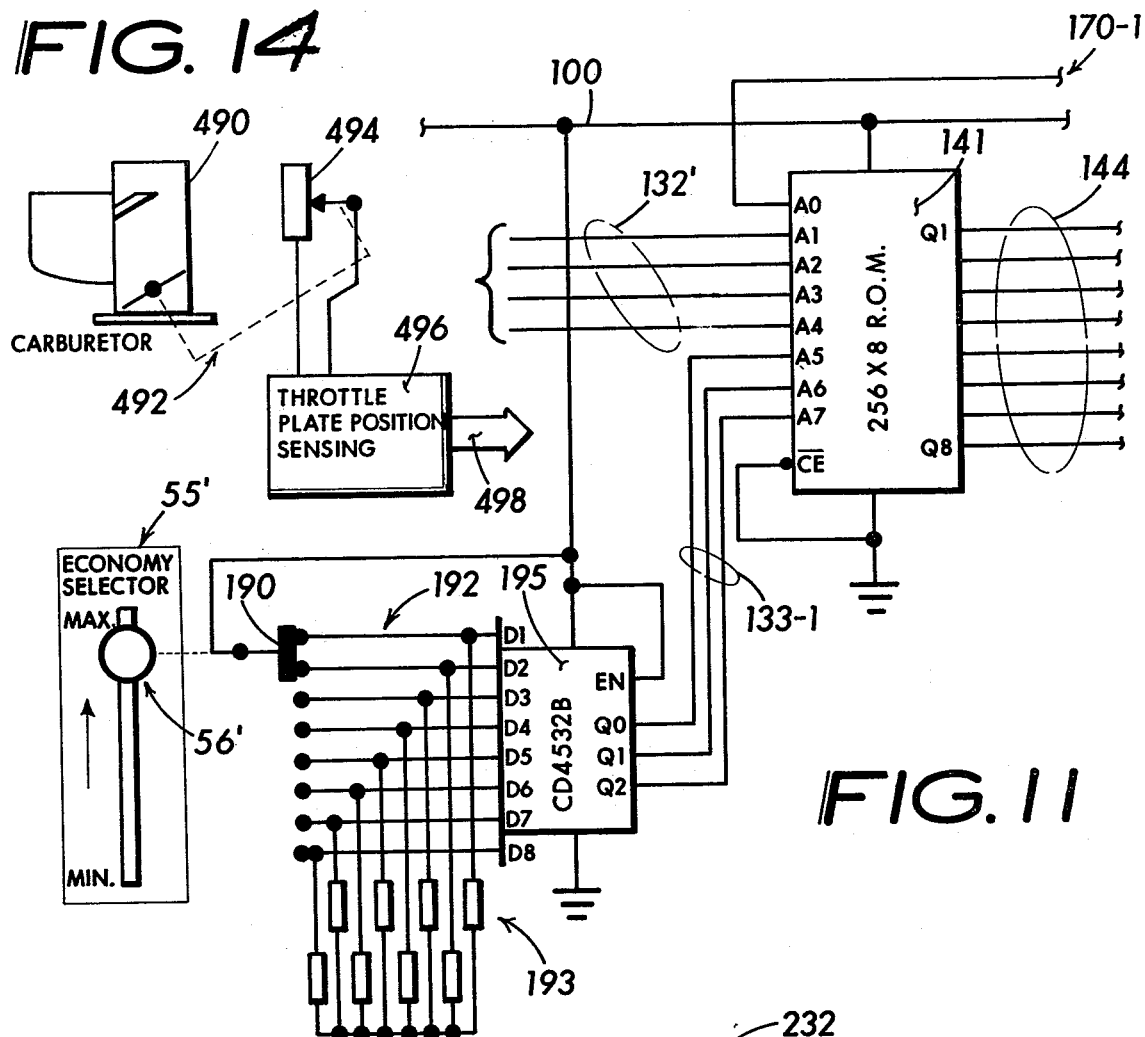
FIG. 14
FIG. 11
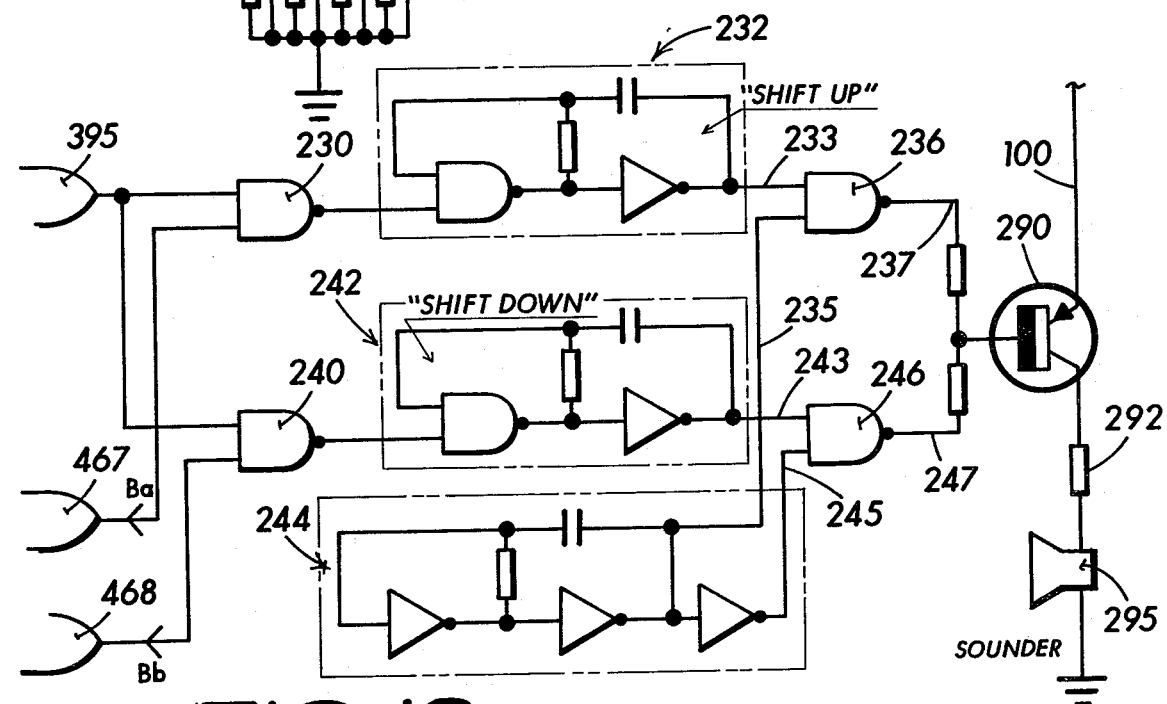
FIG. 12

TEACHING INDICATOR FOR EFFICIENT VEHICLE GEARSHIFT OPERATION

BACKGROUND OF THE INVENTION

My new invention serves to create a dynamic, in situ environment for tutoring a driver as to the correct operation of the standard transmission gearshift changes and clutch action in a motor vehicle under normal road driving conditions. The invention is of particular interest today as manual gearshift transmissions become increasingly more popular due to the desire that the economy of motor vehicle travel be improved. It is well understood that a standard, manual shift transmission can clearly achieve better fuel economy and thereby save the operator much money in the operation of this vehicle. Perhaps more important, in the overall social impact sense, is that the utilization of such a transmission can likewise help conserve the world's natural resources. In order to benefit fully from the promise of improved economy a manual transmission offers, it is also frequently coupled with a small, low output engine. The combination of a four or five speed manual transmission with a four cylinder engine, while capable of great economy, can also be unusually difficult for a novice driver to master. In my U.S. Pat. No. 4,150,497 a basic manual gearshift and clutch training device is taught which combines the engine speed signals, which is in effect the crankshaft revolutions per minute (r.p.m.) of the engine, together with a sensor arrangement which determines the gearshift combination which has been selected, and a sensor which detects the load coupled to the engine by way of the clutch.

With the advent of extraordinarily small engines, the operator can still experience some frustrating problems in handling the manual gear shift timing properly, even in view of the teaching of the prior art U.S. Pat. No. 4,150,497. In particular, when very tiny four cylinder engines of less than about 1,600 cubic centimeters (e.g., 1.6 liters) are employed in a passenger car, a great sacrifice in the driving behaviour of the vehicle is made, and a novice driver can reasonably be expected to encounter great difficulty in not stalling the vehicle, in not lugging the motor of the vehicle, and in knowing the best time to shift gears to obtain the best fuel economy and the least mechanical wear from the vehicle.

In view of these limitations, brought on by very small vehicle engines, I have discovered that further improvement of the advances taught in my earlier U.S. Patent can achieve significantly better instruction for a novice operator of vehicle having tiny engines coupled with a manual gearshift transmission. Of course the experience with the small four cylinder type engines is applicable to larger five, six, and eight cylinder engines in achieving better fuel performance, smoother operation, and less mechanical wear and tear. In particular, when the tiny engine is cold, it exhibits rather poor performance capabilities because there is very little reserve torque. Therefore the shift points for a cold engine, i.e. one yet warming up, are distinctly different from those of an engine which has reached its normal operating temperature. When operating a vehicle having a tine engine, and the vehicle is overloaded as when it is pulling a grade, or has more than two passengers or so, performance suffers and the engine tends to lug and work harder than it ought to. The throttle plate of the carburetor, which is supplying fuel to the engine, will be open somewhat more than it would be under normal driving conditions and the fuel-to-air ratio may be improper as a result, since the vacuum condition in the intake manifold is somewhat lessened. Through providing means, as are now taught in my instant invention, to respond to these abusive engine overload conditions, and modify the shift timing recommendations to the operator, considerably improved vehicle economy and lessened wear-and-tear on the engine can be had.

The use of this new invention is not merely limited to the usual automobile, but it may also be found to be an excellent device for instructing the use of a manual gearshift and clutch means on other road vehicles such as trucks and tractors.

This invention may find particular application in teaching better utilization of the shifting mechanisms in military vehicles, such as tanks and lorries in view of the lessened skill level oftimes today required of an operator of such vehicles, and due to the need for the operator to be able to concentrate on other matters aside from driving procedure, particularly when encountering hostile military action.

The driving aid can also serve to contribute to better driving utilization of tracked vehicles and other off-road machines, such as agricultural machinery, which must be efficiently operated by less than the most experienced drivers.

In-so-far as is known to me, no prior apparatus, aside from my earlier U.S. Patent, exists which produces fully compensated in situ driver instruction in an actual motor vehicle under real road conditions such as the driver normally encounters. The capability for the driver to adjust the degree of economy, e.g. "dial an economy", is hitherto unknown. Therefore may invention now serves to produce a significant improvement in operator performance even when that operator is a novice, while at the same time its teachings act to save significant amounts of energy.

SUMMARY OF INVENTION

My instant invention relates to a dynamic driving aid which provides in situ instruction to the operator of a motor vehicle as to the optimum handling of gearshift and clutch functions. The increased concern on the part of even the average driver for getting better overall fuel economy has renewed the interest in using manual gearshift transmissions having three, four, five and even more shift combinations with small automobiles and trucks having tiny, and oftimes underpowered, engines. The manual shifting of standard transmissions is unusually difficult for a novice driver to master, when the engine has little or no reserve torque, and the difficulty is further compounded when the vehicle is overloaded, not yet warmed up, or otherwise suffering in performance.

In my earlier U.S. Pat. No. 4,150,497 I provided a distinct shift-up indication and shift-down indication to a driver which brought together the functions of engine speed, gear mode selection, and engine load as determined by clutch position to compute the best time for shifting either into a higher, or else into a lower gear, depending upon the instant combination of impending conditions. My earlier invention also tutored the driver in the proper operation of the clutch.

I have discovered however that significant further improvement can be achieved through adapting the earlier invention to also receive engine and vehicle condition signals: most specifically, engine vacuum, engine temperature, gearbox temperature, throttle plate position, and vehicle speed can be brought together to individually or combinatively assist in the computing of the best upshift or downshift point. I also provide the driver with the capability for adjusting the instant performance response, e.g. "dial an economy", of the driving aid indications thereby providing allowance for different driving habits whilst still providing appropriate guidance. My instant invention furthermore reduces operator error in transmission gear selection through real-time display of the gear position which is engaged. This is considerable improvement over the convention of "knowing" what gear the transmission is in by "feel" and/or "recall" of where the gears were last shifted.

This real-time display is arranged to be distinctly visible to the operator and, when combined with the "shift-to" display taught in my earlier U.S. Patent, all the operator has to do is to match the displayed numeric information for optimum results.

It is a purpose of this invention to teach improved operator gearshift operation by giving a distinct upshift and downshift indication, whereby the exact shift-up or shift-down signal is produced by a computed combination of the various conditions of engine speed, gear mode selection, engine loading, and now further improved by engine and vehicle status conditions such as fuel manifold vacuum, engine temperature, transmission temperature, throttle plate position, brake application, and other key parameters.

It is a further purpose of this invention to provide the operator with a clear, distinct indication of the transmission gear selection which is instantly engaged.

While another purpose of this invention is to clearly indicate to the driver of a vehicle which transmission gear selection ought to be engaged.

It is yet another purpose of this invention to teach electronic control processing means which are entirely digital and require a minimum of preset adjustment or maintainence throughout the lifetime of the vehicle.

It is another distinct aspect of this instant invention to include a programmed memory device which determines the correct shift point and performance profile for the attendant vehicle, thereby enabling the manufacture of an overall driving aid apparatus which is low cost and relatively universal in construction and yet capable of accomplishing a very individual driving aid guidance characteristic wrought by the unique memory instruction as adapted to a particular class of vehicle.

A still further purpose of this invention is to show a driver selectable "economy selector" control which enables the driver to modify the electronic control processing responses between that of "MAXIMUM" fuel economy at the sacrifice of speed and acceleration, to a "MINIMUM" setting which alternatively gives optimum shift-point guidance to make for excellent speed and acceleration characteristics, within the limits of the attendant vehicle.

DESCRIPTION OF THE DRAWINGS

FIG. 5 Electrical diagram for engine loading signal source interface and an r.p.m. signal interface with the engine.

FIG. 6 Shows a preferred embodiment of a d.c. power supply capable of adapting the vehicle battery power for operation of the various electronic elements.

FIG. 7A The real time selection display is shown mounted in a typical gear shift lever knob.

FIG. 7B The shift-to digital display dashboard mounted as a numeric number display, and surrounded by an upshift arrow and a downshift arrow for operator guidance.

FIG. 11 Electrical diagram showing the hookup between the driver operated economy selector and the electronic control unit elements.

FIG. 12 Partial electrical diagram showing the shift-up and shift-down warning tone generators.

FIG. 14 Arrangement for carburetor throttle plate sensing.

DESCRIPTION OF INVENTION

Figure 1:
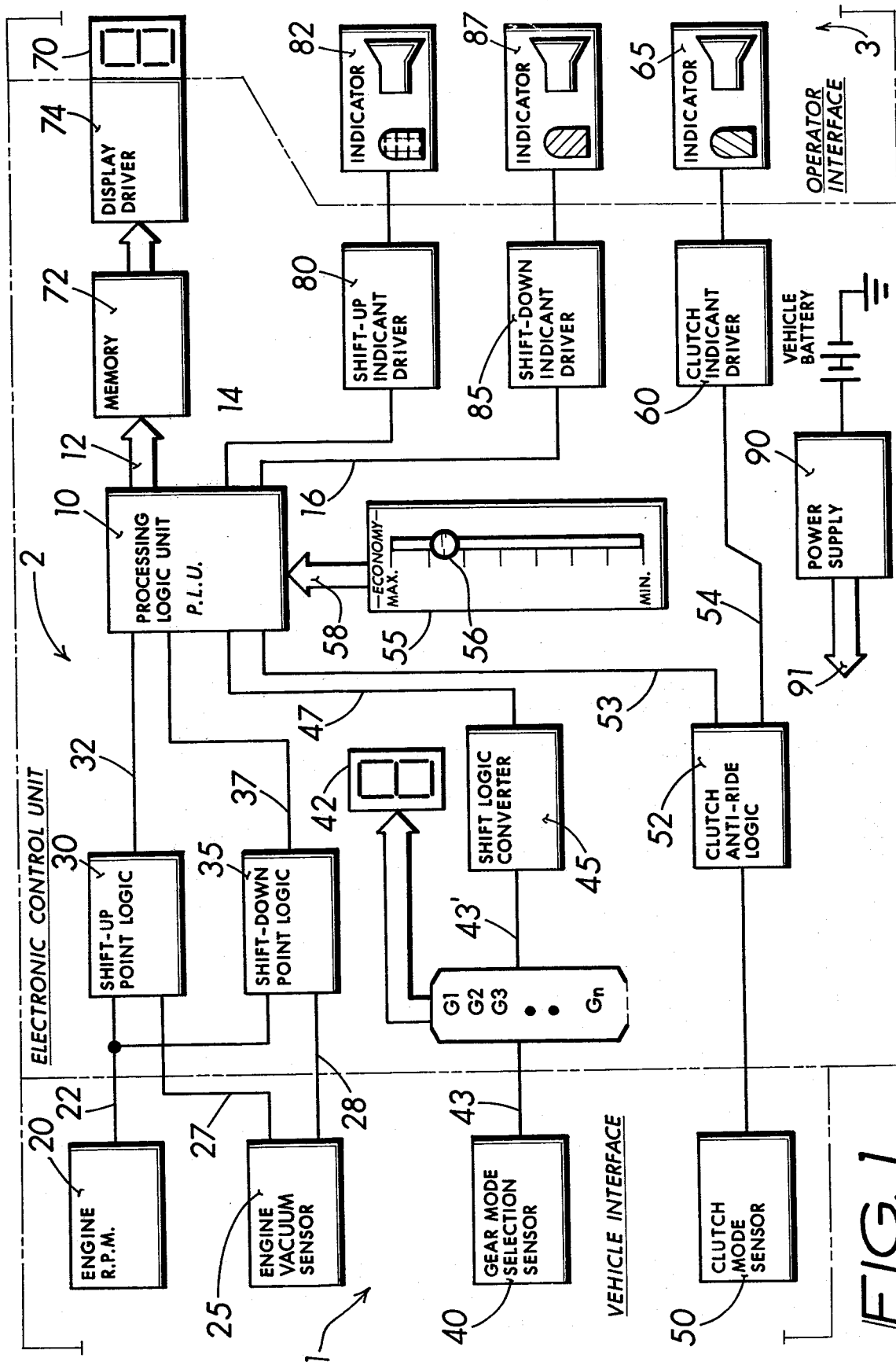
FIG. 1 Overview functional diagram of the essence of most of the instant invention showing the several inputs, the "economy selector", and the indicators.

The gist of my invention appears in the overview drawing FIG. 1. The vehicle interface connections 1 provide engine r.p.m. sensor 20, engine vacuum sensor 25, gear mode selection sensor 40, and clutch mode sensor 50. The electronic control unit 2 receives engine r.p.m. signals 22 and engine vacuum sensor signals 27, 28 which couple with the shift-up point logic 30 and the shift-down point logic 35. It should be understood that the engine vacuum sensor signals 27, 28 may also include of any other essential engine condition signals, such as engine temperature, throttle plate position, etc. as will be described more fully further on. The other vehicle control factors may also combine here, such as transmission temperature, overdrive gearing mode, air conditioning compressor engagement, etc. The signals produced from the shift-up opportunity logic 32 occurs when the engine speed exceeds a predetermined upper r.p.m. rate and the gearing of the vehicle should be put into a higher gear (one having a lower step-down ratio); conversely the shift-down opportunity logic produces a signal 37 which occurs at a lower r.p.m. rate point where the operator should shift into a lower gear (one having a higher step-down ratio). These two signals 32, 37 couple to a processing logic unit (P.L.U.) 10. The P.L.U. also receives gear mode selection signals which indicate 42 that the transmission is in gear "one", etc. denoted by G1, G2, G3 through $G_n$. The denotation of 42 is a visible display to the operator of what gear he has previously selected and is operating in at the moment. The gear mode selector signal 43 couples with shift logic converter 45 which provides a distinctive signal 47 indicative of the gearshift combination which is enagaged. The gear mode selector signal 43 is also adapted as a visual, usually digital, display 42 which clearly shows the operator which gear selection is engaged. The clutch mode sensor 50 couples with the clutch anti-ride logic 52 and produces a signal 53 indicative of engine loading, i.e. the load coupling between the engine and the vehicle drive wheels, as an input to the P.L.U.

A clutch anti-ride warning signal 54 is produced which couples through the clutch indicant driver 60 to a warning indicator 65 which is part of the operator interface 3. This alerts the operator when he is improperly operating the clutch. Such improper operation is defined as neither being fully engaged, nor being fully disengaged, a common error with novice drivers known as "riding the clutch", which leads to premature clutch facing failure.

An "ECONOMY SELECTOR" driver control 55, usually in the preferred form of a slide switch or slide potentiometer having a knob 56 near the driver position and usually associated with the driving aid indicator 70, provides a parameter setting signal 58 to the P.L.U. 10.

The output from the P.L.U. 10 includes a binary word signal 12 coupled with a memory 72. The function of the memory, at this point, is to store the binary word instructing what gear combination the vehicle should be shifted into while the actual shifting is occuring, meaning that the clutch is disengaged and the engine speed and engine load have no correlation. The memory couples through a display driver 74 to a digital display 70 which shows the operator which gear selection he should shift into.

The signal output 14 produced by the P.L.U. is an upshift command which couples with the shift-up indicant driver 80 and thereon to the indicator 82 which, through visual or audible means, tells the operator that he should upshift the vehicle transmission.

The signal output 16 produced by the P.L.U. is a downshift command signal which couples with the shift-down indicator driver 85 and thereon to the indicator 87 which acts to alert the operator that a downshift should occur.

A power supply 90 serves to adapt the usual vehicle battery power into operating potentials for the various electronic circuit elements comprising the substance of the invention.

Figure 2:
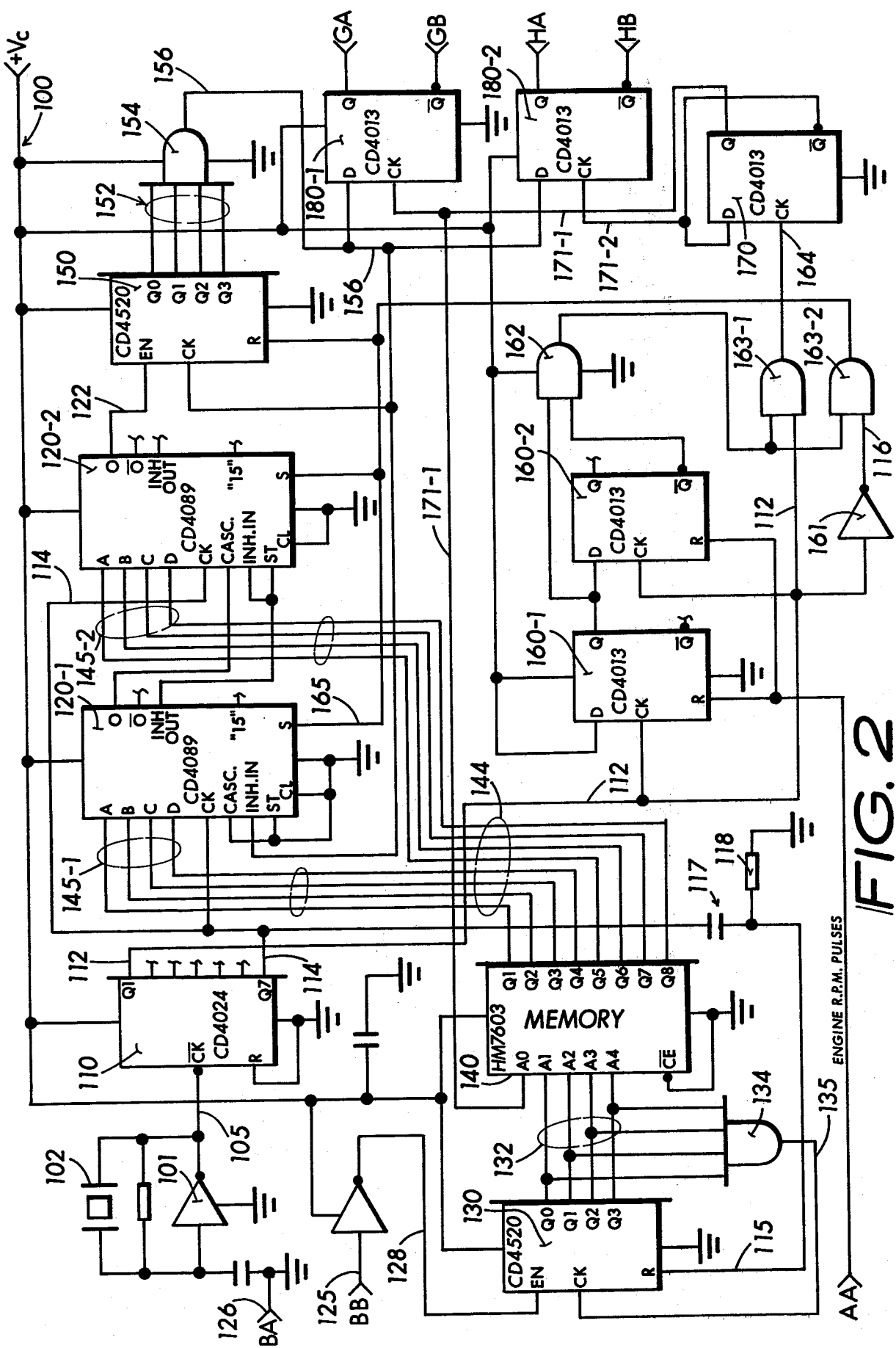
FIG. 2 Electrical diagram of the shift-up and shift-down opportunity determining circuitry as related to the engine speed.

The shift point determining circuitry appears in FIG. 2. An oscillator comprising an amplifier 100 and quartz crystal 102 operating around 3.58 megahertz produces clock signal 105 coupled to the input of a seven bit counter 110. The counter operates as a divide-by-128 function producing a signal 114 effective to clock the input of the two binary rate multipliers 120-1, 120-2. The two C-MOS type CD-4089B rate multipliers depicted in the figure are connected in the "add" mode. The result is a string of pulses on output 122 that correlate with the input clock pulses. In the shown connection, the output pulses will be somewhat less than 255 pulses for every 256 clock pulses 114 fed into the clock inputs of the rate multipliers. The exact number of output pulses occurring for every group of 256 input clock pulses is determined by the binary logic word addressing the input data connections 145-1, 145-2 of each rate multiplier. A comprehensive discussion of the CD-4089B rate multiplier used in this configuration is given in the "R.C.A. INTEGRATED CIRCUITS" handbook SSD-210, 1976 edition published by R.C.A. Solid State Corporation, Box 3200, Somerville, N.J. 08876 on pages 583-585.

The signal connecting to in BA connection 125 is an a.c. pulse train having a repetition rate proportional to the engine status conditions of vacuum, temperature, throttle plate setting, etc., as determined by the circuitry yet to be described for FIG. 5. This input signal serves as the clocking pulse signal for binary divider 130 which acts to produce a sixteen level binary word at the output 132 which is proportional to the engine status signal. The binary word on line 132 is proportional to the ratio between the frequency of the incoming status signal 125 compared to the reset signal frequency provided from the Q7 output 114 of counter 110. The resulting binary word 132 couples with the input of a memory to produce eight outputs therefrom, four of which couple 145-1 to the input of rate multiplier 120-1 and four of which couple 145-2 to the input of rate multiplier 120-2. These eight outputs 144 serve to set the rate multiplier total count, and thereby the exact "shift up" or "shift down" opportunity is set. When the connection 170-1 on the memory 140 is HIGH the "shift down" count is active. When the signal on line 170-1 is LOW the "shift up" count is active. Thus the memory operates in a reflex mode and provides sixteen output combinations of shift-up opportunities, and sixteen output combinations of shift-down opportunities, which may be skewed by the engine status signals acting on the counter 130 and effecting variable address of the read only memory 140 remaining inputs A1 through A4.

Counter 150 receives the rate multiplier pulses 122, producing a binary output 152 which couples with AND gate 154 and acts to "race" between the engine r.p.m. pulses as one referred input to the RESET function, and the rate multiplier pulses 122 as the other referred input to the CLOCK function thereof. If the rate multiplier pulses overflow the counter 150, the gate 154 output 156 shifts to a logic HIGH jamming the counter 150; conversely when the rate multiplier pulses are insufficient and the counter 150 underflows between reset, the output 156 of the AND gate remains LOW. The engine r.p.m. pulses are brought in on terminal AA and coupled to the RESET input of flip-flops 160-1, 160-2. The flip-flops are clocked from the Q1 output 112 of counter 110. When reset occurs, the output of the "D" type flip-flops is reset. When the reset signal is removed, the clocking action advances the output of the two flip-flops rapidly and in combination with the AND gates 162, 163-1, 163-2 and inverter 161 will produce first a pulse on the clok input line 164 coupled with flip-flop 170 and subsequently on the reset line 165 as coupled to the reset input of counter 150 and the set input of the two rate multipliers 120-1, 120-2. Each the clock pulse 164 and the reset pulse 165 have a duration equal to one-half the cycle period of the clock frequency derived from the Q1 output 112 of counter 110. Flip-flop 170 acts as a divide-by-two, or complementing operator, and the positive transistion of signal 170-1, 170-2 serves to clock the respective latch flip-flop 180-1, 180-2 and thereby capture the instantaneous level appearing on the "D" input line. This latched signal condition then produces a corresponding signal at the GA, GB output of latch 180-1, and HA, HB outputs of latch 180-2 corresponding with the UPSHIFT and DOWNSHIFT data signal respectively.

Figure 3:
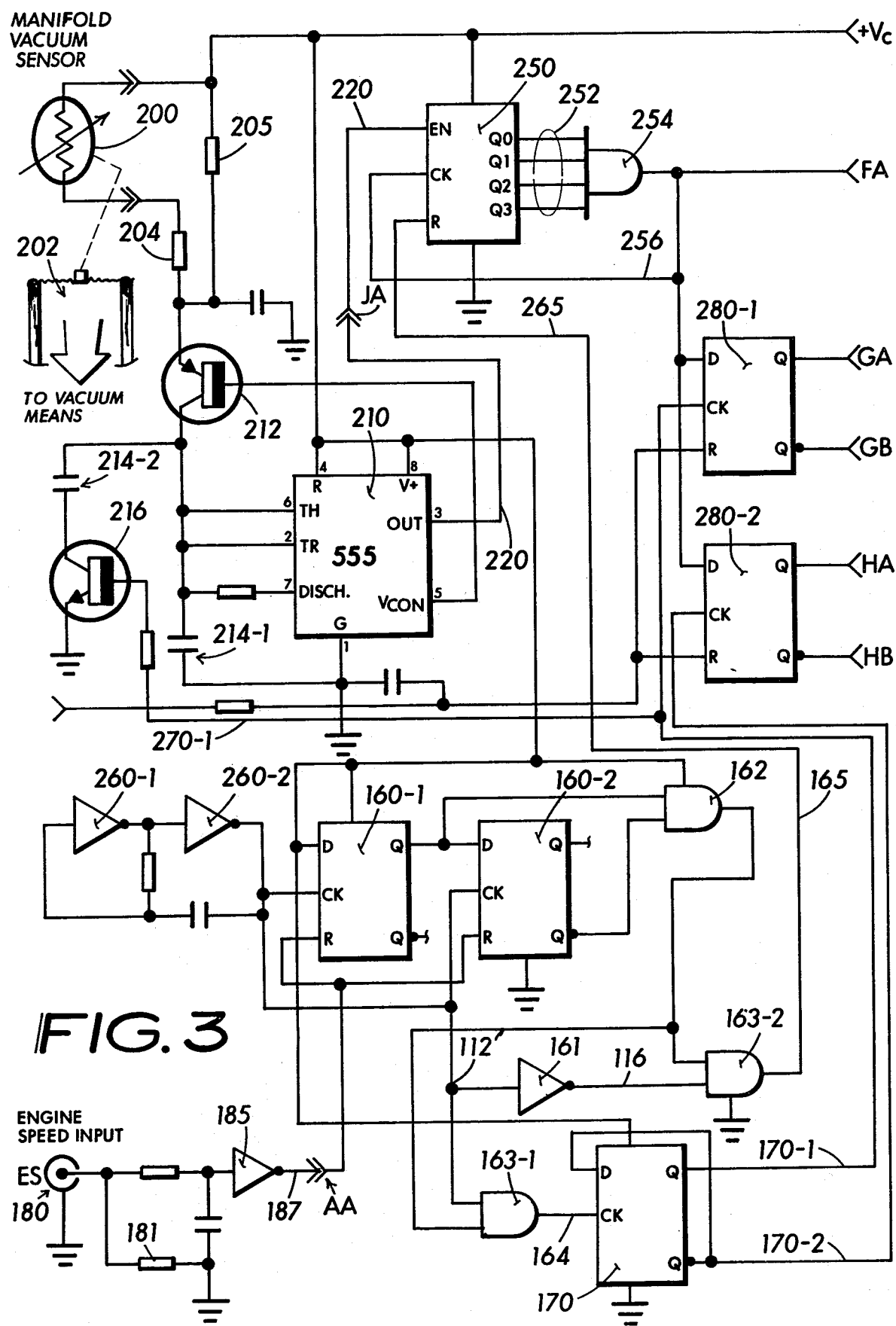
FIG. 3 Electrical diagram for the circuitry attendant for determining various engine operting parameters.

An alternative upshift and downshift opportunity determining means appears in FIG. 3. The heart of this particular embodiment comprises a type 555 integrated circuit timer. The purpose of the timer is to operate as a free-running astable multivibrator which produces clock pulses on line 220 which advance the states of counter 250 and produces a binary byte signal on line 252 and combined in gate 254. The result of the signal on line 256 which, aside from latching the counter from receiving any further counts once it has overflowed, also serves as input to the "D" line on latch flip-flops 280-1, 280-2 which provides the "upshift" signals GA, GB and the "downshift" signals HA, HB respectively. The advantage of this embodiment is that the clock pulse rate on line 220 may be established to vary in accord with the manifold vacuum sensor 200 signals which are derived by a coupling 202 with the engine manifold. Therefore an engine vacuum responsive signal, which to some extent reflects engine loading and efficiency, couples through the trim resistor 204 and padding resistor 205 that are predetermined to give the correct percentage influence in combination with the resistive element built into sensor 200, to the emitter circuit of a constant current charging transistor 212. The PNP transistor 212 collector circuit couples with the timing capacitor 214 which then determines the oscillating period of the astable hookup of the timer 210. The upshift frequency is determined by capacitor 214-1 alone receiving current from the transistor 212, whilst the downshift frequency of the oscillator is determined by the combination of capacitors 214-1, 214-2 wherein capacitor 214-2 is switched into the charging circuit by NPN transistor 216 when an active level appears on line 170-1, as coupled from the output of the alternating flip-flop 170. Latch signal 170-1 and reset signal 170-2 are controlled by the oscillator comprising inverters 260-1, 260-2 together with the flip-flops and gate functions as described earlier for FIG. 2. The engine speed input AA is shown to include a line receiver amplifier comprising inverter 185 and a terminating resistance 181 which couples with the source of engine r.p.m. speed through connector 180. This produces a pulse train on the inverter output 187 which couples with the AA input of the loop reset function.

Figure 4:
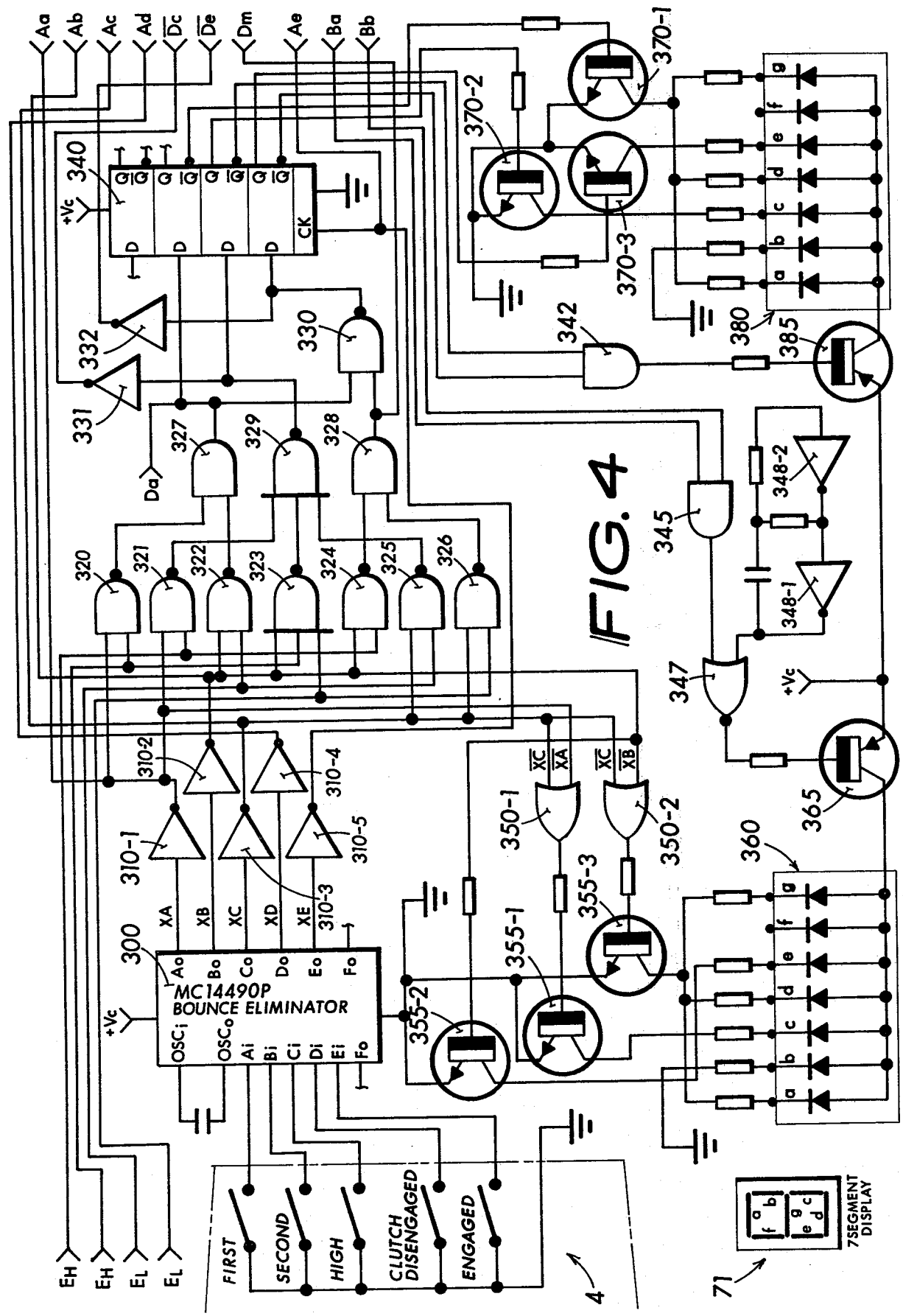
FIG. 4 Electrical diagram for the real-time gear selection display, the processing logic unit for detecting shift opportunity, and the "shift to" gear selection display.

Much of the processing logic unit and display functions circuitry is depicted in FIG. 4. An input to the circuitry of FIG. 4 includes various switches or sensors 4 coupled with the transmission shifting mechanism and the clutch mechanism of the vehicle. The arrangement is depicted for a standard "three speed" manual shift transmission. It is obvious to extend this to four-speed, five-speed, or more shift position transmissions. As shown, the first, second, and high switches connect with the corresponding selector mechanism of the transmission which reflects the gear which is engaged. In a like way, the switches shown for clutch "disengaged" corresponds with the clutch being fully depressed by the operator's foot, whereas the "engaged" condition is when the clutch pedal is fully released by the operator, i.e. his foot is not even slightly depressing the pedal. The input from these several switch closures connect with a Motorola Semiconductor Corp. type MC-14490P "bounce eliminator" integrated circuit, serving to adapt the noisy switch closure signals into a steady state signal at the output XA, XB, XC, XD, XE. Each of these outputs connect through corresponding inverters 310-1, 310-2, 310-3, 310-4, 310-5. The output of the inverters in part couples with OR gates 350-1, 350-2 which produce signals coupling with the base of transistors 355-1, 355-2, whilst the 310-2 inverter output couples the XB signal directly to the base of transistor 355-2. The three transistors 355-1, 355-2, 355-3 couple with six of the seven segments of display 360. The layout of the seven segments comprising the display is shown 71 and through activating "b" and "c" the numeral "1" appears; activating segments "a", "b", "d", "e", and "g" produces numeral "2"; whilst activating segments "a", "b", "c", "d", and "g" displays the numeral "3". The display 360 therefore shows the driver which gear is instantly engaged by the selector. The PNP transistor 365 gates the display "on and off" in response to valid or invalid signal conditions. NAND gates 320 through 330 serve as combinatorial logic acting to determine "upshift" and "downshift" opportunities in view of the instant gear selector position, and the upshift or downshift signals arriving on lines EH, EL as connected from the detectors of FIG. 2 or FIG. 3. A latch 340 stores (as a memory) the shift information when the dynamic information arriving from the combinatorial logic is invalid. The storage is effected by the clutch signal produced on the XE output line from the bounce eliminator 300, being a signal which occurs the instant the clutch pedal is depressed. The output from the latches couple primarily with the NPN transistors 370-1, 370-2, 370-3 which serve to activate the corresponding digital display 380 showing which gear should next be shifted into, and gate 342 senses an invalid combination of signals and disrupts the current flow to the display 380 segments by way of PNP transistor 385. In a like way AND gate 345 senses invalid states coming on lines $B_a$, $B_b$ and by way of NOR gate 347 signals PNP transistor to shut-off or illuminate display 360. A low frequency multivibrator comprising inverters 348-1, 348-2 and operating around one hertz induces the display 360 to "flash" repetitively when either the $B_a$ or the $B_b$ line is logic LOW. Alternatively, when lines $B_a$, $B_b$ are both logic HIGH the display 360 will be steadily illuminated. The purpose of this condition is that the "flashing" display 360 denotes to the operator that a shift should occur at this time.

Engine loading signals are provided as shown in FIG. 5 from a source 5 which may include a vacuum sensor means 202' which appears as a variable resistance 200' and also may include a temperature sensor means 207 which, likewise, effects a variable resistance component 206 connected in series with the vacuum sensor resistance 200'. Through predetermining the range of the resistances 200', 206 a low impedance, high noise immunity, interconnecting cable 208 may be utilized to control the illumination produced by a lamp in an optocoupler 400 whereby the lamp acts upon a light sensitive resistor (e.g. cadmium sulfide) 402 and further wherein the light responsive resistance 402 couples with a "trim" resistor 404, and a "padding" resistor 405 each of which are predetermined in value to provide the correct net total range in response, wherein the combination of the resistors are used in a multivibrator circuit combination including inverters 410-1, 410-2 together with timing condenser 412 to produce a pulse train at the output JA which is controlled in frequency in proportion to the relationship between vacuum and temperature of the engine.

The engine speed signal ES is shown in FIG. 5 to be derived from the usual motor vehicle ignition system 6, including an ignition coil 6-1, a condensor 6-2, and breaker points 6-3. The electric pulse signal occuring effectively across the points is coupled 420 through protective components into the base circuit of a NPN transistor 425-1 and subsequently by way of that transistor's collector circuit, onto the base circuit of yet another transistor 425-2 connected as an emitter follower, including a resistor 427 (usually on the order of 470 ohms) across which a pulse train signal is produced and appears at the output lead 428.

A low voltage power supply appears in FIG. 6 capable of producing the requisite $+V_c$ power 100 for energization of the various circuit elements comprising the invention. The primary power is coupled through a fuse 431 from a connection 432 with the usual vehicle battery, while an integrated circuit voltage regulator 430, such as a Fairchild Semiconductor Corp. type uA-7805, serves to regulate the $+V_c$ power and make it immune to battery voltage variations.

The typical gear shifter knob 440, such as mounted on the gearshift extension arm 442 of the usual "floor shift" arrangement appears in FIG. 7A to include the digital display 444 that gives indication of the existing gearshift selected combination, i.e. digital display 42 of FIG. 1.

A driver viewable display 450 appears in FIG. 7B which most conveniently is mounted near the speedometer cluster in a motor vehicle, and includes an upshift indicant arrow 452, a downshift indicant arrow 454, and a digital display 456 which shows the gear choice into which the transmission ought to next be shifted, e.g. the display 70 of FIG. 1.

Figure 8:
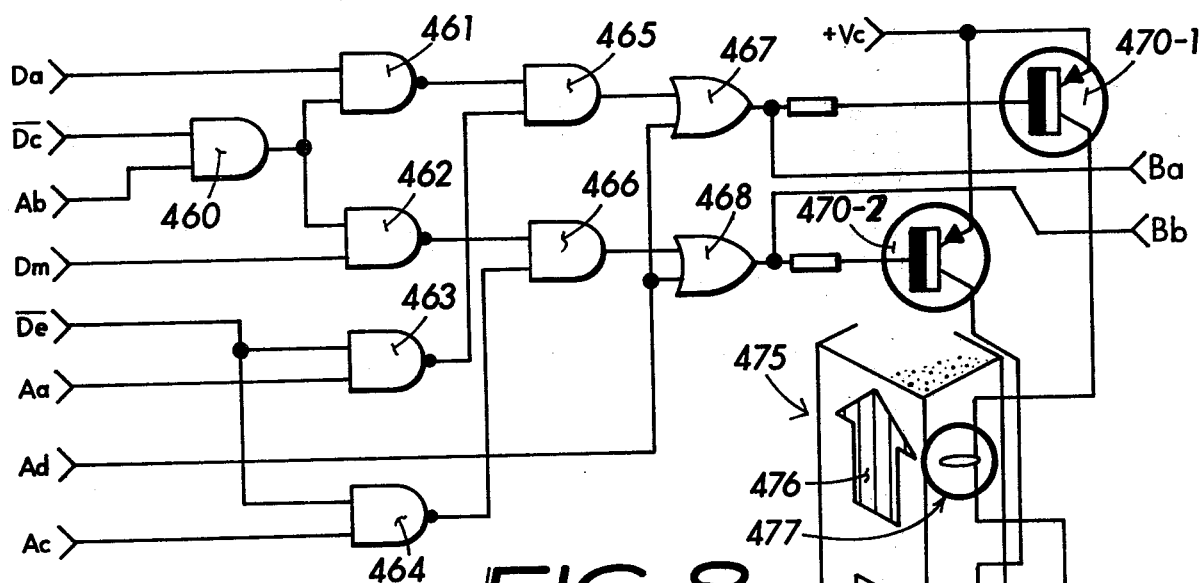
FIG. 8 Electrical diagram for an upshift or downshift display decoder.

The decoding circuitry necessary to combine various signals produced principally by the circuit combinations of FIG. 4 into upshift and downshift indication signals is depicted in FIG. 8. Several gate functions 460, through 468 serve to provide a combinatorial logic function which, based upon the input signals state combinations, provides an output LOW state signal to the base of either PNP transistor 470-1 or 470-2 which serves to illuminate either lamp 477 or 479 respectively, wherein the lamps are situate proximate with the driver indication 475 including the suggested "upshift" and "downshift" arrows. The $B_a$, $B_b$ outputs interconnect with corresponding inputs of FIG. 4 which act to produce the "flashing" function of the display 360 in that figure.

Figure 9:
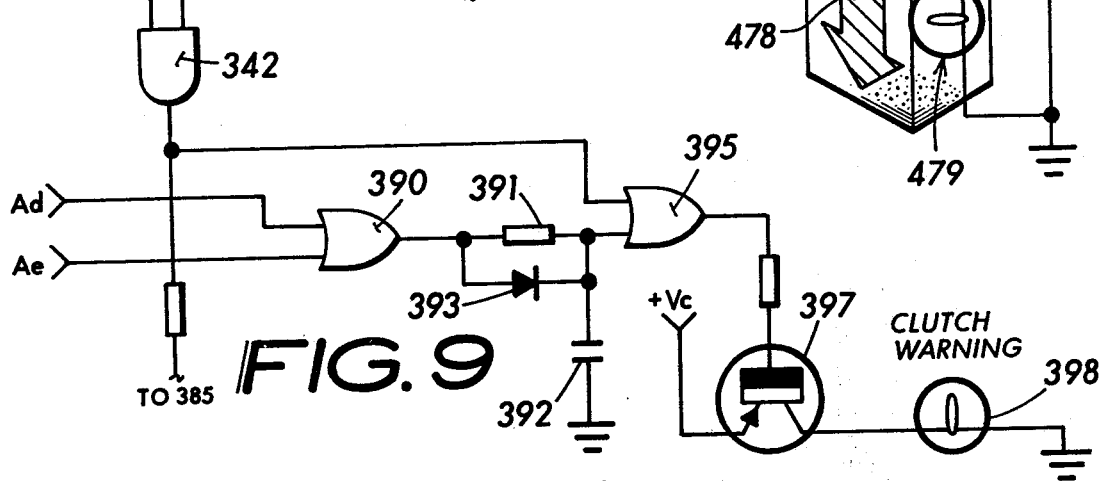
FIG. 9 Electrical diagram for clutch warning indicator.

The termination of several signals are brought together in the circuit of FIG. 9 to an OR gate 390, an integrator network including resistor 391, capacitor 392, and discharge diode 393 coupled with the input of a C-MOS OR gate 395 to produce a LOW state out of gate 395 as coupled to PNP transistor 397 whenever AD, AE are simultaneously LOW for a period of time exceeding the time constant of the integrator, which may be about one second. This serves to turn transistor 397 "on", thereby illuminating a clutch warning lamp 398 or other such indication. This results in a driver indication that warns the driver to the effect he is riding the clutch improperly.

Figure 10:
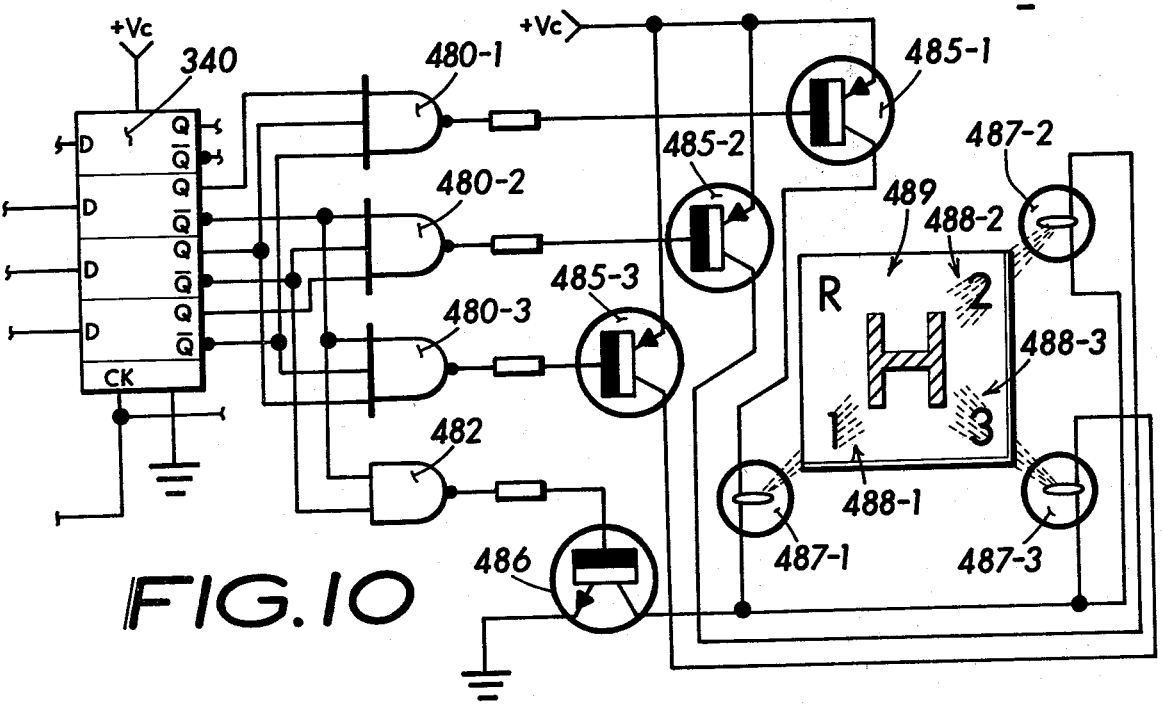
FIG. 10 Electrical diagram for the real time shift indicator numeric display driver and decoder.

The output of the latch 340 in FIG. 10 is combined through NAND gates 480-1, 480-2, 480-3 to produce three distinctive outputs coupled respectively to the bases of transistors 485-1, 485-2, 485-3. Each of these PNP transistors couple with lamps 487-1, 487-2, 487-3 which serve to illuminate the indicant numbers 488-1, 488-2, 488-3 arranged on a display bezel 489 wherein the display is reminiscent of the shift pattern for the transmission. As the FIG. 10 illustration shows, the typical "three speed" transmission "H" pattern is depicted. The NAND gate 482 provides a LOW output state whenever the input states thereto show that no gear selection is valid, thereby turning "off" transistor 486 and correspondingly the associated lamps.

The operator adjustable, dashboard mounted, "ECONOMY SELECTOR" 55' appears in FIG. 11, coupled with a make-before-break multipole switch 190 which provides eight inputs 192 to a "priority encoder" 195, such as a C-MOS type CD-4532B. The pulldown resistors 193 serve to hold the D1 through D8 inputs to the encoder LOW, while the switch 190 detent acts to pull at least one line 192 HIGH. The output 133-1 of the encoder is a three bit byte signal coupled into the most significant bit lines of a memory 141. The least significant bit lines are coupled 171-1, 132' to the corresponding connections referenced in FIG. 2 with the output line 144 also coupled as shown in FIG. 2. Through the drivers various positionings of knob 56', clearly eight different combinations of the read-only-memory (r.o.m.) output conditions can be driven which are, in turn, further modified by the input signals on lines 132'. The output of OR gates 395, 467, 468 provide signals which combine through NAND gate 230, 240 in FIG. 12 to produce the enabling input to a tone generating multivibrator 232, 242 to give respective tone signals on lines 233, 243 which, preferably, is of a higher pitch (say about 700 hertz) for an "upshift" signal, and of a lower pitch (say about 500 hertz) for a "downshift" signal. The multivibrator 244 produces an alternating pulse train signal on lines 235, 245 having a rate on the order of two hertz combined in NAND gate 236, 246 to produce the pulsing of the tones appearing at the respective NAND gate outputs, which furthermore produces an alternating HIGH/LOW pitch tone whenever the gate 395 output is LOW. Therefore, the audible signal for the operator is a "beep" for an impending upshift, a "boop" for an impending downshift, and an alternating "beep-boop" for clutch abuse. The NAND gate 236, 246 produce the respective signals 237, 247 which couple to the base of PNP transistor 290 which, through volume limiting resistor 292, couples with a sounder 295, e.g. a small radio loudspeaker, etc.

Figure 13:
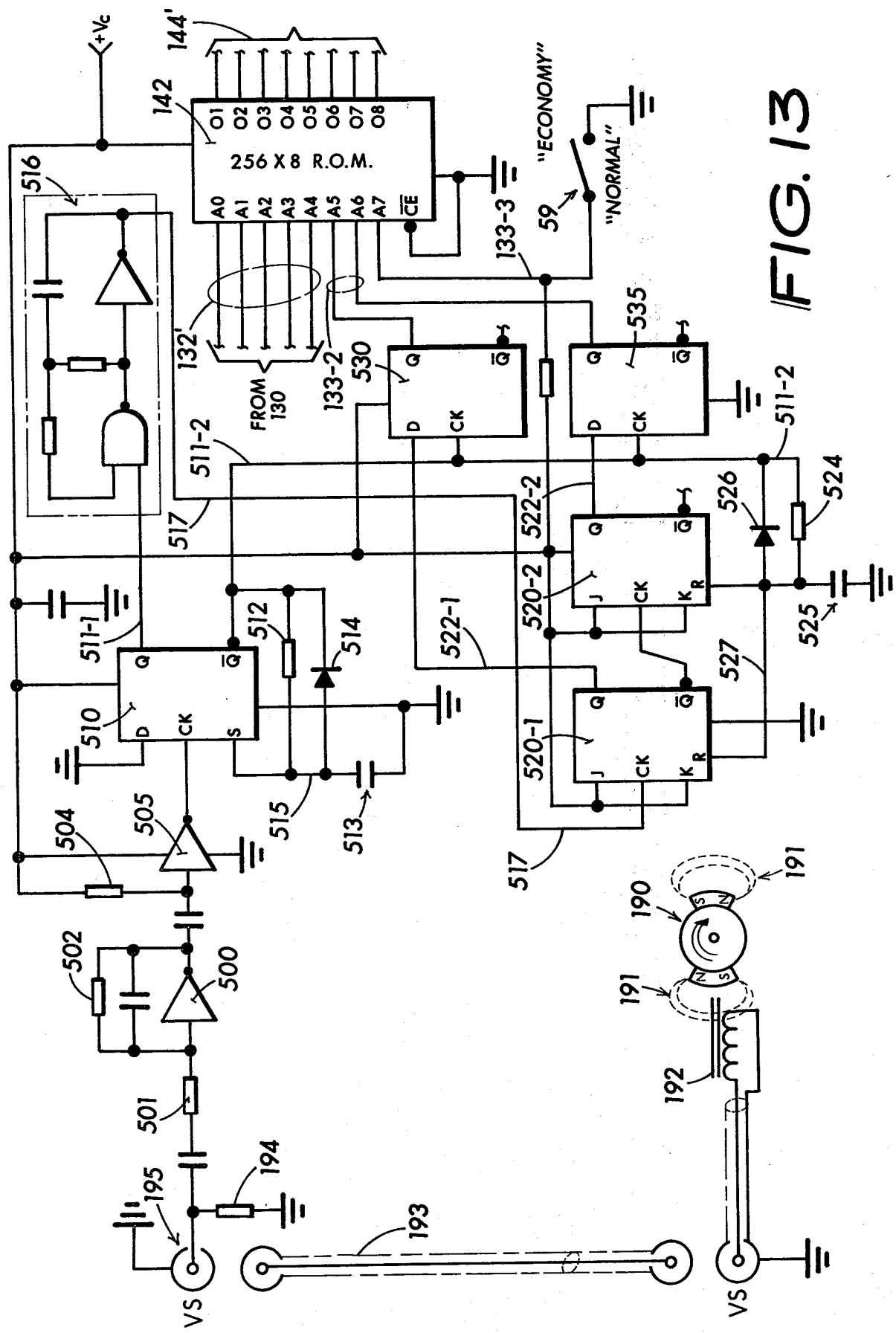
FIG. 13 Electrical diagram for vehicle speed sensing to provide speed dependent addressing of the memory element essential with the electronic control unit.

The vehicle speed is an important parameter in that the shift opportunity for "shifting up" or "shifting down" in the higher gear ranges when driving at highway speed is significantly different from the optimum point when making shifts at low speeds, i.e. city driving conditions. Therefore by sensing the vehicle's relative speed and computing various speed ranges therefrom, some adjustment of the shift point responses can be provided. The second embodiment of FIG. 13 shows the vehicle driveshaft or output drive member from the transmission 190 to include magnets producing fields 191 which couple with magnetic pickup 192 to produce pulses VS which through interconnection cable 193 inputs 195 with an amplifier 500 including gain set resistors 501, 502 and pickup terminating resistor 194. The amplifier increases the pickup pulse amplitude to a level whereby the voltage developed across resistor 504 is of sufficient swing to cause the HIGH/LOW transistion of C-MOS inverter 505. This action serves to clock a "D" flip-flop 510 which, through coupling the $\overline{Q}$ output 511-2 through an integrator comprising resistor 512 and condensor 513 acts as a one-shot by way of presetting the "D" flip-flop from the HIGH signal developed at juncture 515 as condensor 513 charges. Diode 514 is a discharge diode for the integrator. When flip-flop 510 is preset, the Q output 511-1 is HIGH enabling the multivibrator 516, the frequency $F_{CM}$ of which is predetermined to be about $F_{CM} F_{VS(max.)} = 80$ Hertz, for the following representative conditions:

| Vehicle<br>Speed MPH | Driveshaft<br>Speed RPM (typ.) | Frequency<br>$F_{VS}$ |
|---|---|---|
| 60 | 2,400 | 80 Hz. |
| 45 | 1,800 | 60 Hz. |
| 30 | 1,200 | 40 Hz. |
| 15 | 600 | 20 Hz. |

The $F_{CM}$ signal on line 517 couples with the clock input of J-K flip-flop 520-1 that, in combination with flip-flop 520-2 yields a "divide by four" counter. The counter advances states, with the Q output 522-1 coupled with the "D" input of flip-flop 530, whilst the Q output 522-2 couples with the "D" input of flip-flop 535. When a $F_{VS}$ signal pulse couples from the output of inverter 505 and clocks one-shot flip-flop 510, the Q output 511-2 goes HIGH coupling with the clock inputs of flip-flops 530, 535 thereby grabbing and storing the "D" input states present the instant the positive edge occurs. At the same time, the Q output 511-1 disables multivibrator 516, halting counter advancement of flip-flops 520-1, 520-2.

The HIGH state on line 511-1 also couples through an integrator including resistor 524 and condensor 525 to produce a reset signal on line 527 coupled with flip-flops 520-1, 520-2 to effectively reset their count states immediately after the data is entered into the storage flip-flops 530, 535. The Q outputs of flip-flops 530, 535 couple 133-2 with the significant bit inputs A5, A6 of memory 142. Also shown in FIG. 13 is the inclusion of a two position driver operable performance selector switch 59 which can be actuated by vehicle driver between an "ECONOMY" position and a "NORMAL" position. This is a less costly version of the similar function provided by the ECONOMY SELECTOR 55' in FIG. 11, albeit not providing the variety of selection.

My driving aid is anticipated to cover any category of vehicle which may find advantage from the teaching. This includes: automobiles, trucks, tractors, off-road motor vehicles, farm machinery, construction machinery, and the like. This further includes military and industrial vehicles. This continues to include other types of vehicles where some advantage may be brought forth, and adaptation is practicable, including flying machines and other vessels.

The essence of the invention is to provide a driving aid apparatus which combines performance signals from the engine, condition signals from the transmission, and load signals together with other vehicle related signals, and to modify the combinatorial effect of these signals by way of an operator adjustment to provide a driving aid indication which best suits the driving preferance of the individual operator.

The invention further provides a driving aid apparatus which combines the engine and vehicle related signals, and modifies the combinatorial effect of these signals by way of a unique vehicle performance profile stored in memory, to produce output indications which best suit the particular vehicle's combination of power, gearing ratio combinations, weight, and application.

While specific embodiments of my invention have been illustrated and described herein, it is the very essence of the invention to teach a driving aid apparatus which can assist the operator of a motor vehicle in shifting the transmission gear combinations at the optimum performance points as determined by the computed combination of numerous vehicle status signals. Therefore it is realized that modifications and changes in the apparatus will occur to those skilled in the art which will suitably fullfill the intended requirements. It is therefore to be clearly understood that the appended claims are intended to cover all such modifications and changes as fall within the true spirit and scope of my invention.

What I claim is:

1. Driving aid apparatus coupled with a motor vehicle means including manual gearshift transmission means, wherein the apparatus combines at least two dynamic signals provided by means responsive to the condition of engine speed, gearing selection, and effective load coupling, to provide driver indication for obtaining opportune gearshift changes, furthermore comprising:
   signal combining means coupled with said dynamic signals and effective to combine the instant values thereof to produce at least a gearshift indicant signal output therefrom;
   predetermining means coupled with said combining means and effective therewith to variously modify the effective combination of the dynamic signals in proportion to any predetermined signal values; and,
   indicator means coupled with said indicant signal and effective to provide the driver with indication for at least one of impending upshift, impending downshift, and a figurative signal of which gearing range should be engaged.

2. Driving aid apparatus of claim 1 wherein said apparatus includes upshift detector means coupled with said signal combining means effective to establish the threshold for the exact opportunity response of said upshift indication.

3. Driving aid apparatus of claim 1 wherein said apparatus includes downshift detector means coupled with said signal combining means effective to establish the threshold for the exact opportunity response of said downshift indication.

4. Driving aid apparatus of claim 1 wherein further said indicator means as coupled with said combining means produces an indication for the instant engaged gear combination of the said manual gearshift transmission.

5. Driving aid apparatus of claim 4 wherein the figurative signal representing the instantly engaged gearshift selection is provided as an indicant means integral with the usual gearshift knob affixed to the gearshift selector control mechanism extension arm.

6. Driving aid apparatus of claim 1 wherein said predetermining means comprises an in situ adjustable means, serving to predetermine a vehicle performance factor that may be selected by the vehicle driver.

7. Driving aid apparatus of claim 1 wherein is provided driver selectable means coupled with said predetermining means and effective therewith to modify the determining basis for the indication significance as provided to the driver.

8. Driving aid apparatus of claim 1 including driver control means coupled therewith which provides for an in situ readjustment of the predetermined signal serving thereby to modify the effective indicant signals to best suit the vehicle's performance capability relative with the driver's needs.

9. Driving aid apparatus of claim 1 wherein further a mainfold vacuum sensor means effects a source of dynamic signal which couples with the combining means to modify said indicant signal in proportion to the instant mainfold vacuum.

10. Driving aid apparatus of claim 1 wherein further a throttle pleate position sensor means effects a source of dynamic signal which couples with the combining means to modify said indicant signal in proportion to the instant position thereof.

11. Driving aid apparatus of claim 1 wherein further a temperature sensor means coupled with said vehicle engine effects a source of dynamic signal which couples with the combining means to modify said indicant signal in proportion to the instant engine temperature.

12. Driving aid apparatus of claim 1 wherein further a temperature sensor means coupled with said transmission means effects a source of dynamic signal which couples with the combining means to modify said indicant signal in proportion to the instant transmission temperature.

13. Driving aid apparatus of claim 1 wherein said source of dynamic signal comprises at least one engine loading signal source sensor coupled with said vehicle engine whereby said sensor is coupled with the signal combining means by way of a low impedance circuit including an optical coupler at the receiving end thereof.

14. Driving aid apparatus of claim 1 wherein said indicator means comprises a display reminiscent of the actual shift pattern of the vehicle, wherein the shift position which is instantly engaged is illuminated.

15. Driving aid apparatus of claim 14 wherein said indicator means is provided substantially integral with a gearshift control knob as coupled with the vehicle transmission means.

16. Driving aid apparatus of claim 1 wherein said indicator means comprises a display reminiscent of the actual shift pattern of the vehicle, wherein the shift position which ought to be engaged is illuminated.

17. Driving aid apparatus of claim 16 wherein said indicator means is provided substantially integral with a gearshift control knob as coupled with the vehicle transmission means.

18. Driving aid apparatus of claim 1 wherein further the signal combining means includes a clutch "anti-ride" detector effectively coupled with the vehicle clutch means which provides a clutch warning signal to the operator when the clutch is improperly engaged.

19. Driving aid apparatus of claim 1 wherein said indicator means effective for producing the figurative signal comprises at least a digital display element.

20. Driving aid apparatus of claim 1 wherein said signal combining means couples with vehicle speed responsive means and is therewith effective to produce indicant signal values proportional to vehicle speed.

21. Driving aid apparatus of claim 1 wherein predetermined signal values representative of the vehicle performance profile are stored in memory means coupled with said combining means.

22. Driving aid apparatus of claim 22 wherein said vehicle performance profile values are uniquely predetermined for the individual motor vehicle means.

23. Driving aid apparatus of claim 1 wherein a shift opportunity indication is provided by in situ display means visible to the driver.

24. Driving aid apparatus of claim 1 wherein a shift opportunity indication is provided by in situ acoustic signal producing means audible to the driver.

25. Driving aid apparatus coupled with a motor vehicle means including manual gearshift transmission means, comprising therefor:
first source means of dynamic signal derived from the instant condition of at least one of engine speed, gearing selection, and effective load coupling;
second source means of predetermining signals derived from the instant values provided by at least one of operator adjustable performance selector means, and vehicle performance profile memory means;
combinatorial control means having input means coupled with said first and second source means and effective to combine said signals into at least a shift opportunity output signal; and,
indicator means coupled with said output signal, effective to provide the driver with indication for at least one of impending upshift, impending downshift, and a figurative signal depicting which gearing range should be engaged.

* * * * *